United States Patent
Sendrowski et al.

(10) Patent No.: US 8,705,171 B2
(45) Date of Patent: Apr. 22, 2014

(54) ARRANGEMENT FOR ANALYZING MICROSCOPIC AND MACROSCOPIC PREPARATIONS

(75) Inventors: Peter Sendrowski, Leimen (DE); Claus Kress, Neckargemuend (DE)

(73) Assignee: Leica Microsystems CMS GmbH, Wetzlar (DE)

(*) Notice: Subject to any disclaimer, the term of this patent is extended or adjusted under 35 U.S.C. 154(b) by 690 days.

(21) Appl. No.: 12/681,262

(22) PCT Filed: Sep. 24, 2008

(86) PCT No.: PCT/EP2008/062749
§ 371 (c)(1),
(2), (4) Date: Apr. 15, 2010

(87) PCT Pub. No.: WO2009/047117
PCT Pub. Date: Apr. 16, 2009

(65) Prior Publication Data
US 2010/0271695 A1 Oct. 28, 2010

(30) Foreign Application Priority Data
Oct. 5, 2007 (DE) .................. 10 2007 048 089

(51) Int. Cl.
*G02B 21/00* (2006.01)
(52) U.S. Cl.
USPC ........................... 359/368; 359/379; 359/380
(58) Field of Classification Search
USPC .................. 359/368, 379, 380, 385, 391
See application file for complete search history.

(56) References Cited

U.S. PATENT DOCUMENTS

| 7,138,640 B1 | 11/2006 | Delgado et al. |
| 7,369,305 B2* | 5/2008 | Wolleschensky et al. .... 359/380 |
| 7,488,931 B2* | 2/2009 | Wolleschensky et al. .... 250/234 |
| 7,888,628 B2* | 2/2011 | Wolleschensky et al. .... 250/234 |
| 2005/0139748 A1* | 6/2005 | Kitahara ................... 250/201.3 |
| 2006/0011832 A1* | 1/2006 | Wolleschensky et al. .... 250/310 |
| 2006/0049343 A1* | 3/2006 | Wolleschensky et al. .... 250/234 |
| 2006/0077536 A1* | 4/2006 | Bromage et al. ............ 359/368 |

(Continued)

FOREIGN PATENT DOCUMENTS

| DE | 10344294 | 4/2005 |
| DE | 102004011770 | 10/2005 |

(Continued)

OTHER PUBLICATIONS

International Preliminary Report on Patentability issued on May 11, 2010 for PCT/EP2008/062749.

(Continued)

*Primary Examiner* — Frank Font
(74) *Attorney, Agent, or Firm* — Schlee IP International, P.C.; Alexander R. Schlee

(57) ABSTRACT

A confocal scanning microscope for examining microscopic and macroscopic objects is described. The microscope comprises: a scanning optical system having optical elements imaging the light generated by a laser onto an object to be examined; an objective provided in a working distance of at least 0.4 inches from an object holder; and a zoom optical system that is connected to the scanning optical system such that the light generated by the laser passes first through the scanning optical system, then through the zoom optical system, and is then imaged through the objective onto the object. This microscope achieves that also macroscopic objects can be viewed at a high resolution.

10 Claims, 5 Drawing Sheets

(56) References Cited

U.S. PATENT DOCUMENTS

| | | | |
|---|---|---|---|
| 2006/0109459 A1* | 5/2006 | Kramer et al. .................. | 356/301 |
| 2007/0076293 A1* | 4/2007 | Wolleschensky et al. .... | 359/385 |
| 2008/0151243 A1* | 6/2008 | Seyfried et al. ............... | 356/326 |
| 2009/0040602 A1* | 2/2009 | Spilman et al. ................ | 359/386 |
| 2009/0236522 A1* | 9/2009 | Wolleschensky et al. .... | 250/307 |

FOREIGN PATENT DOCUMENTS

| | | |
|---|---|---|
| DE | 102004034989 | 2/2006 |
| DE | 102004034992 | 2/2006 |
| DE | 102004051356 | 4/2006 |
| JP | 56-151912 | 11/1981 |
| JP | 2005-17657 | 1/2005 |

OTHER PUBLICATIONS

Dixon, A. et al.: :A New Confocal Scanning Beam Laser Macroscope Using a Telecentric F-theta Laser Scan Lens, Journal of Microscopy, Wiley-Blackwell Publishing Ltd., GB, vol. 178, No. Part 03, Jun. 1, 1995, pp. 261-266, 1995 The Royal Microscopical Society.

* cited by examiner

ARRANGEMENT FOR ANALYZING MICROSCOPIC AND MACROSCOPIC PREPARATIONS

CROSS-REFERENCE TO RELATED APPLICATIONS

This application is a national phase entry based on the International Patent Application PCT/EP2008/062749 filed on Sep. 24, 2008 that claims the priority of the German patent application DE 102007048089.1 that was filed on Oct. 5, 2007. The entire content of this prior German patent application and PCT application are herewith incorporated by reference.

BACKGROUND OF THE INVENTION

The invention relates to an arrangement for examining microscopic and macroscopic specimens with a scanning microscope. In particular, the invention relates to an arrangement for examining microscopic and macroscopic specimens with a scanning microscope that comprises a laser and optical means which image the light generated by the laser onto a specimen to be examined. In particular, the scanning microscope can be designed as a confocal microscope.

Up to now, scanning microscopes are known in the prior art, with which microscopic specimens can be examined. In scanning microscopy, a specimen is scanned by means of a light beam. To this end, lasers are used as light sources. However, it is not possible up to now to also examine large macroscopic objects such as small fishes with a conventional confocal laser scanning microscope since neither the working distance nor the scan field are dimensioned accordingly. There is, however, an increasing demand to also examine macroscopic objects with a high resolution, in particular for pharmaceutical problems or also in developmental biology. It is, for example, of high interest for the understanding of the mechanism of action of pharmaceuticals to examine also larger objects such as zebrafishes directly under a microscope. Due to their transparence, zebrafishes are very well suited for light microscopic examinations.

SUMMARY OF THE INVENTION

Thus, it is the object of the invention to provide a scanning microscope which enables specimen examination with high resolution also in the case of macroscopic objects.

This object is solved by an arrangement which is characterized in that the scanning optical system of a scanning microscope is connected to a zoom optical system. Such a zoom optical system is, for example, known from stereo microscopes. By combining a scanning optical system with a zoom optical system, a new type of scanning microscope is created which stands out due to a large and variable working distance, typically of up to about 80 mm but even more. By way of the large working distance, also larger objects can be examined. Further, a large and variable visual field having a diameter in the diagonal of up to 20 mm or even more is obtained. As a result thereof, an overview image of large objects having a size of up to several cm, in particular up to 2 cm in size, can be generated.

DETAILED DESCRIPTION OF THE INVENTION

In order to set a different magnification range, no objective change is required but by way of the zoom optical system a changed magnification can be set, and the object can be examined from the macro up to the micro range with highest resolution and good image quality. This means in particular that no change in position of the specimen is required for different magnification levels, and thus damages can largely be excluded.

The zoom optical system can be equipped both with micro objectives and with macro objectives in order to guarantee the highest image quality for the respective area to be examined. In particular, by way of the zoom optical system, overview images can be generated very fast in order to then, by changing the magnification, observe details of the object without a further objective change with highest resolution. This results in a very efficient work.

Since the working distance of the objective is very large, a large and comfortable working area is created which facilitates specimen manipulation. Compared to conventional microscopes, the accessibility to the specimen as well as specimen change are clearly improved. Specimen change can take place substantially faster, safer and even more comfortably.

Altogether, a microscope is thus created which stands out both in the macro as well as in the micro range due to highest resolution and image quality. In addition, the entire system stands out due to a very compact structure. Thus, by way of combining a scanning optical system of a scanning microscope with a zoom optical system a novel optical system has been created which allows new examination methods, in particular for developmental biology.

Advantageously, a continuous base plate is provided as an object holder so that it can easily be cleaned.

In the drawing the inventive subject-matter is schematically illustrated and is described in the following with reference to the drawing.

DETAILED DESCRIPTION OF THE DRAWINGS

Figure 1:
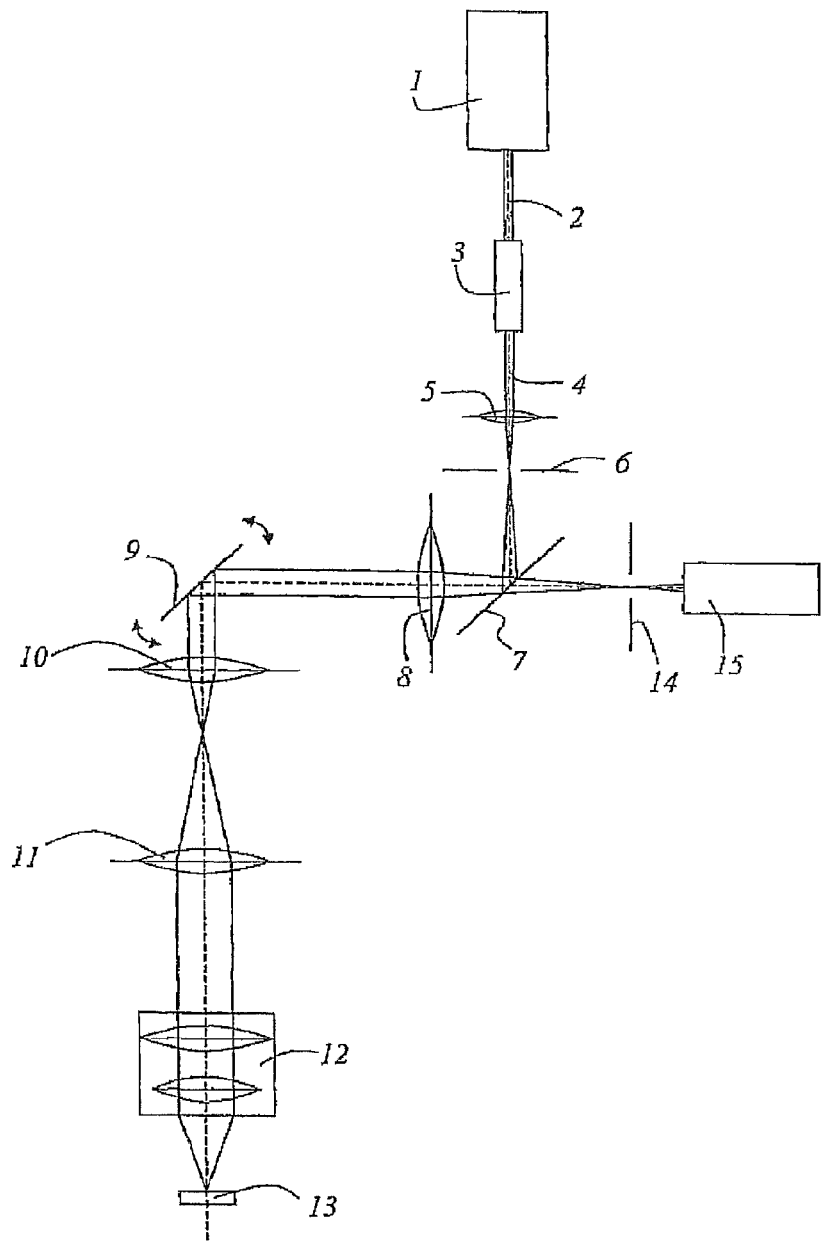
FIG. 1 shows an arrangement of a confocal scanning microscope according to the prior art.

FIG. 1 shows a confocal scanning microscope according to the prior art comprising a pulse laser 1 that generates a pulsed laser beam 2 which is passed through an optical element 3 here. From the optical element 3 an illumination light 4 exits which is imaged by a first optical system 5 onto an illumination aperture 6 and is then incident on a beam splitter 7. From the beam splitter 7, the illumination light 4 passes to a second optical system 8 which generates a parallel light beam that is incident on a scanning mirror 9. Several optical systems 10 and 11 shaping the light beam are arranged downstream of the scanning mirror 9. The light beam 4 arrives at an objective 12 from which it is imaged onto a specimen 13. The light reflected or emitted by the specimen 13 defines an observation beam path 4b. The light of the observation beam path 4b again passes through the second optical system 8 and is imaged onto a detection aperture 14 which is located in front of a detector 15. Preferably, the detector 15 is a photomultiplier. The detector can, however, also be designed as a camera, wherein it can particularly be a CCD or EMCCD camera. Designing the detector as a detector array, in particular in the form of an APD array, is likewise possible. In a manner known per se, the specimen is scanned in X-, Y-, but also in Z-direction, and the detection light is registered each time, and an observation image is generated from the measurement signals. In known confocal scanning microscopes, however, the working distance between the objective 12 and the specimen 13 is very little so that only microscopic objects can be observed.

Figure 2:
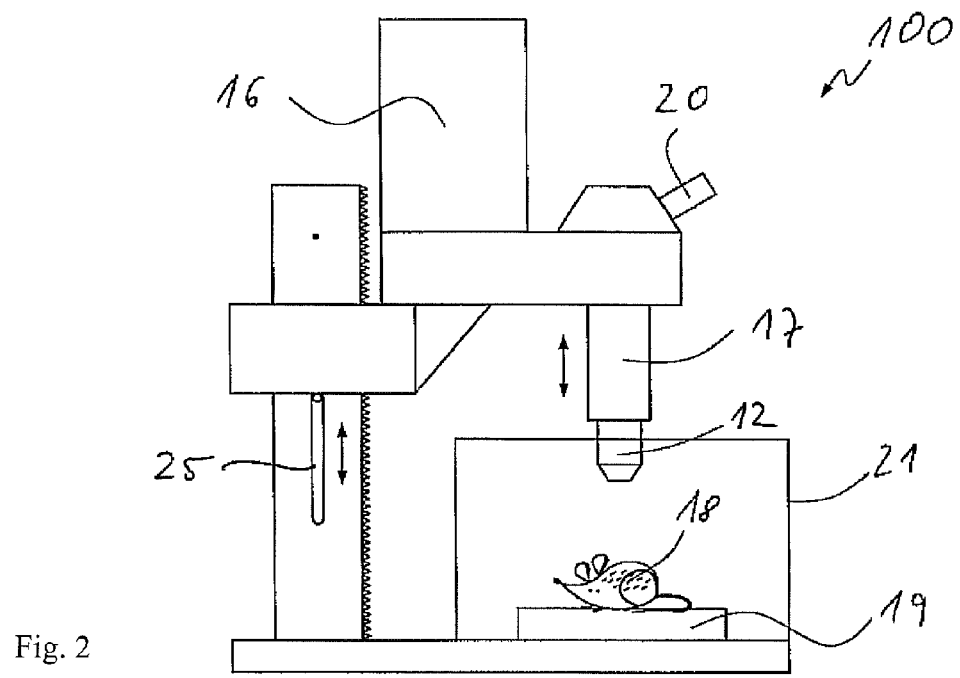
FIG. 2 is a schematic illustration of the inventive arrangement of a confocal scanning microscope having a zoom optical system.
Figure 3:
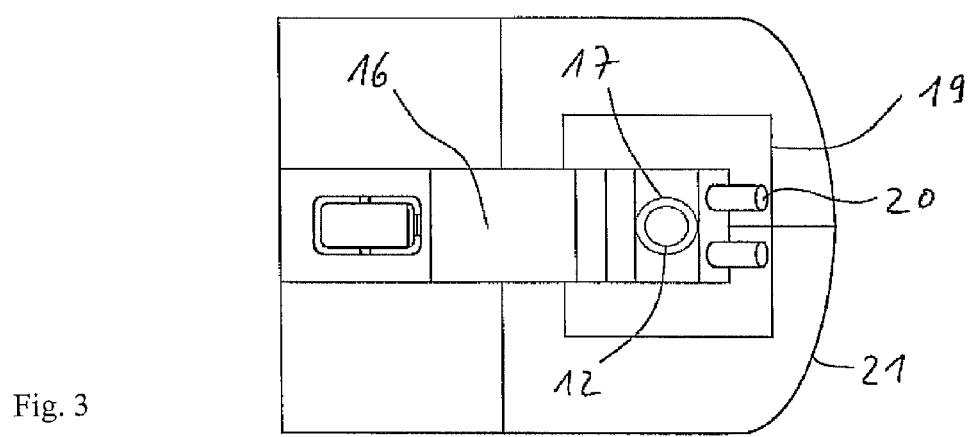
FIG. 3 is an illustration of the inventive scanning microscope from FIG. 2 in a perspective viewed from above.

In the inventive arrangement illustrated in FIG. 2, the scanning optical system 16 which comprises a scanning element such as a scanning mirror and further optical elements as, for example, described in FIG. 1, is connected with a zoom optical system 17. Preferably, the zoom optical system 17 is located between the scanning optical system 16 and the objective 12. Such zoom optical systems are known for stereo microscopes and allow a great working distance.

By combining a zoom optical system 17 with a scanning optical system 16 a new type of a scanning microscope 100 is created which stands out due to a large and variable working distance, typically of up to about 80 mm but also more with respect to the specimen 18. By way of the large working distance, also larger objects can be examined. Further, a large and variable visual field having a diameter in the diagonal of up to 20 mm or even more is obtained. As a result thereof, an overview image of large objects having a size of up to several cm, in particular of up to 2 cm in size, can be generated.

In order to set a different magnification range no objective change is required but by way of the zoom optical system a changed magnification can be set, and the object can be examined from the macro up to the micro range with highest resolution and good image quality. This means, in particular, that no change in position of the specimen is required for different magnification levels, and thus damages can largely be excluded. Altogether, a microscope is thus created that stands out both in the micro as well as in the macro range due to highest resolution and image quality. In addition, the entire system stands out due to a very compact structure.

Thus, by combining a scanning optical system 16 of a confocal scanning microscope with a zoom optical system 17 a novel optical system has been created which allows new examination methods, in particular for developmental biology.

The zoom optical system 17 can be equipped both with micro objectives as well as with macro objectives in order to guarantee the highest image quality for the respective area to be examined. In particular, by means of the zoom optical system 17, overview images can be generated very fast in order to then, by a change in the magnification, observe details of the object without a further objective change with highest resolution. This results in a very efficient work.

Since the working distance of the objective 12 is very large, a large and comfortable working area is created which facilitates specimen manipulation. Compared to conventional microscopes, the accessibility to the specimen as well as specimen change are clearly improved. Specimen change can take place substantially faster, safer and even more comfortably.

For holding the specimen 18, advantageously a continuous base plate is provided as an object holder 19 so that it can easily be cleaned. Further, for observation of the specimen 18 an eyepiece 20 is provided which allows direct observation of the specimen 18. However, it is likewise possible to use a digital camera for image taking instead of the eyepiece. The scanned image of the object 18 is, in contrast, taken in the detector which is not illustrated here in more detail and is preferably located in the scanning optical system 16.

Due to the large working distance, there results however the safety problem with respect to occurring laser radiation. This is solved by a protection cover 21 which is arranged in the area of the specimen table 19 and shields occurring scattering light. Preferably, the protection cover 21 is comprised of a plastic material absorbing laser light, preferably a broad wavelength range being covered. In particular, the protection cover 21 is designed to be pivoted open in order to allow good accessibility to the specimen 18.

Figure 4:
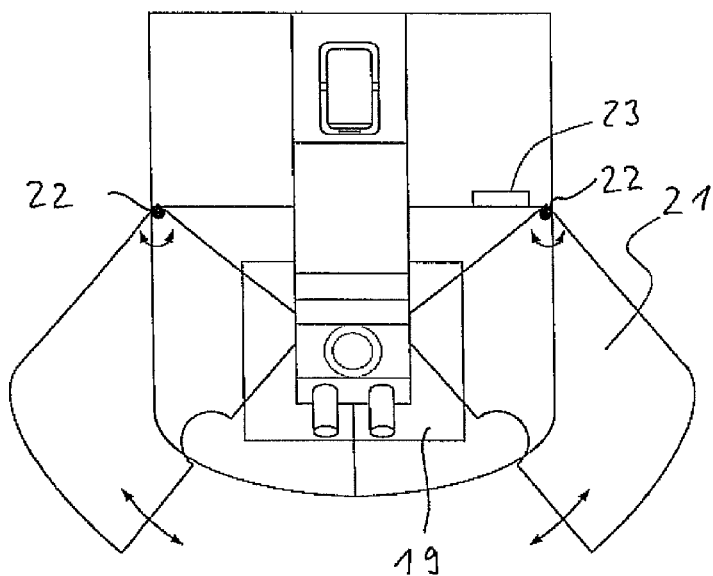
FIG. 4 is an extended illustration of FIG. 3 with a protection cover.
Figure 5:
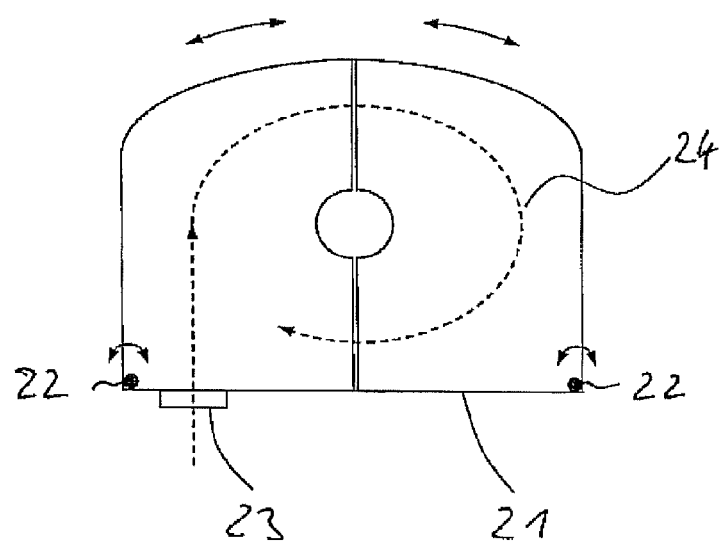
FIG. 5 is an illustration of the protection cover from FIG. 4 viewed from above.
Figure 6:
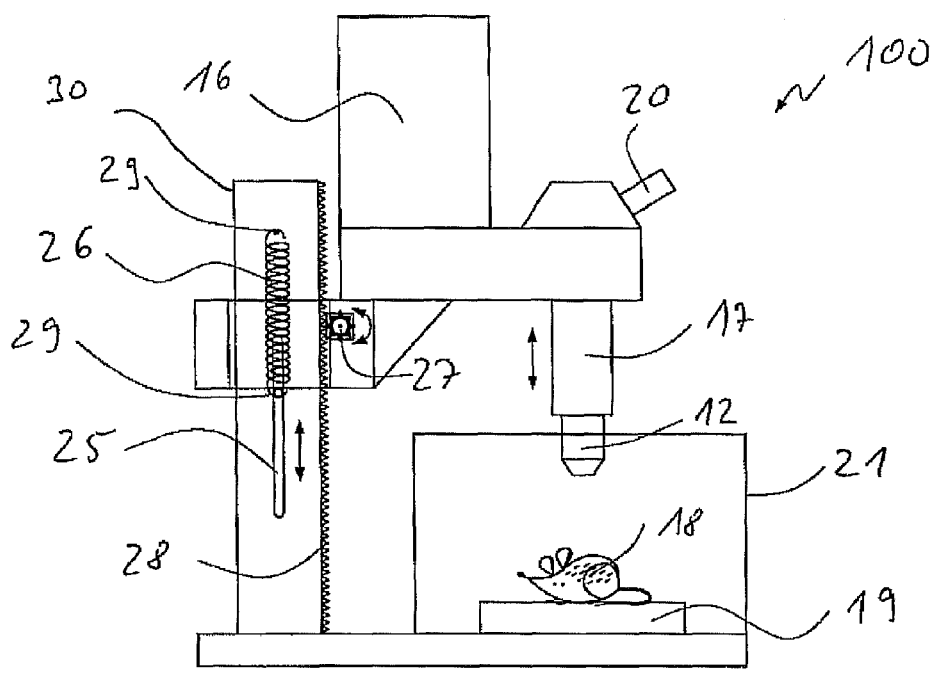
FIG. 6 is an extended illustration of FIG. 2 with a tension spring.
Figure 7:
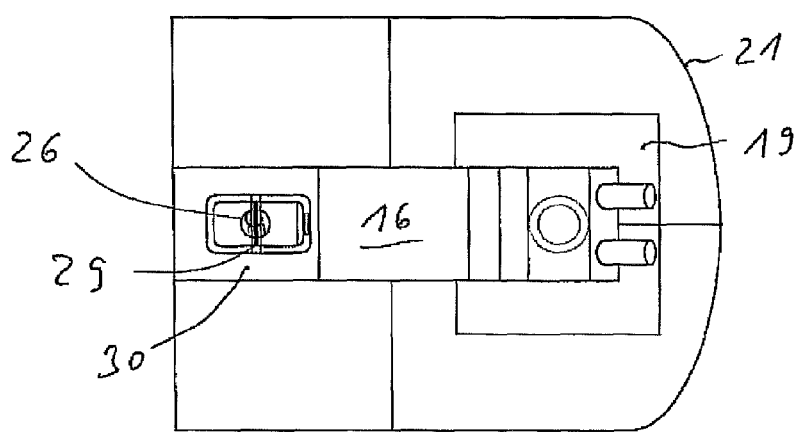
FIG. 7 is an illustration of the inventive scanning microscope in a perspective viewed from above with a tension spring and a transverse bolt.

Such a protection cover 21 is schematically illustrated in FIG. 4. Preferably, the protection cover 21 is present in the two-part form, the two parts of the protection cover 21 each being fixed at pivot points 22 so that the two parts of the protection cover 21 can be pivoted. When pivoting the protection cover 21 towards the side, a good accessibility of the working area is made possible. Since by pivoting the protection cover 21 the specimen space can be accessed well, the specimen 18 to be examined can be placed easily and uncomplicatedly on the specimen table 19 and, if necessary, can even be prepared.

In a further embodiment, the protection cover 21 is designed as an environmental chamber in order to guarantee a suitable atmospheric environment for the specimen 19. Preferably, inlet openings 23 for gas feeds are provided, which allow a fast ventilation of the environmental chamber 21. Since the protection cover 21 is manufactured from absorbing plastic material for reasons of laser safety, this also serves as a protection of the specimen against extraneous light, since the penetration of scattering light is limited by the respective filter effect. This is of particular interest given biological long-term examinations.

By the shape of the protection cover 21 the gas flow 24 in the environmental chamber can be controlled in a defined manner so that damages to the specimen by gas flows can be largely excluded. In particular, by a curved shape of the environmental chamber 21 a circular gas flow can be achieved in which at the position of the specimen 18 the flow speed is very little and thus damages to the specimen 18 can be largely excluded. In particular, as a result of the defined gas flow, less disturbing dirt particles that have been raised by the gas flow can deposit on the specimen 18.

The environmental chamber 21 can, in addition, be equipped with further heating and cooling elements.

Having this design, the environmental chamber 21 is not restricted to the area of use for confocal laser scanning microscopy, but can also be used in other microscopes, in particular conventional light microscopes.

By incorporating a zoom optical system in a confocal scanning microscope, a higher load on the Z drive 25 is given as a result of the high own weight of the zoom optical system 17. Since, however, the compactness of a confocal scanning microscope shall be maintained, according to the invention the mounting of a tension spring 26 inside the drive or holding mechanism is provided by means of which an increase of the payload is made possible without using a more powerful servo motor 27 or a more powerful mechanism. According to the invention, a tension spring 26 having a suitable spring constant is chosen which allows a neutralization of the load to be moved, i.e. of the scanning optical system 16 with the zoom optical system 17. As a result thereof, the required torque of the servo motor 27 can be reduced since the spring 26 takes part of the weight. Altogether, thus the servo motor 27 as well as a gear rack 28 can be dimensioned smaller which results in a very compact total structure. The tension spring 26 is preferably held by bolts 29 in the support or holding arm 30 so that it can quickly and easily be replaced, if necessary. Further, an infinite setting of the bias of the spring 26 by means of a screw is conceivable. In particular, the spring mechanism is inserted in the support or holding arm 30 of the housing so that the tension spring 26 is protected against contamination from outside and a risk of injury is minimized as well. In addition, by way of this construction conventional scanning microscopes can be retrofitted as well.

What is claimed is:

1. A confocal scanning microscope for examining microscopic and macroscopic objects, said microscope comprising:
    a scanning optical system having optical elements imaging the light generated by a laser onto an object to be examined;
    an objective provided in a working distance of at least 0.4 inches from an object holder;
    a zoom optical system that is connected to the scanning optical system such that the light generated by the laser passes first through the scanning optical system, then through the zoom optical system, and is then imaged through the objective onto the object; and
    a tension spring for compensating at least in part a gravity force resulting from weight of the scanning optical system and zoom optical system.

2. The confocal scanning microscope according to claim 1, wherein a working distance of more than 80 mm is provided.

3. The confocal scanning microscope according to claim 2, wherein a visual field of up to 20 mm is provided.

4. The confocal scanning microscope according to claim 1, further comprising a protection cover.

5. The confocal scanning microscope according to claim 4, wherein the protection cover is comprised of plastic material absorbing laser light.

6. The confocal scanning microscope according to claim 4, wherein the protection cover has a curved shape so that a circular gas flow can be achieved.

7. The confocal scanning microscope according to claim 4, further comprising inlet openings for gas feeds allowing a fast ventilation of the protection cover.

8. The confocal scanning microscope according to claim 4, wherein the protection cover has two parts, both parts of the protection cover being hinged at respective pivot points so that the two parts of the protection cover can be pivoted towards and away from each other.

9. The confocal scanning microscope according to claim 1, wherein the tension spring has a suitable spring constant that allows compensating the entire gravity force resulting from weight of the scanning optical system and of the zoom optical system that are moved in relation to the object holder.

10. The confocal scanning microscope according to claim 1, wherein the tension spring is held by bolts in at least one of a support and a holding arm.

* * * * *